United States Patent Office 3,209,017
Patented Sept. 28, 1965

3,209,017
DIHYDROCARBYL TIN SALTS OF TRITHIO-
CARBODIGLYCOLIC ACID
Ingenuin Hechenbleikner and Otto A. Homberg, Cincinnati, Ohio, assignors to Carlisle Chemical Works, Inc., Reading, Ohio, a corporation of Ohio
No Drawing. Filed Sept. 22, 1961, Ser. No. 139,876
2 Claims. (Cl. 260—429.7)

This invention relates to novel organotin compounds and to the stabilization of solid polymers of monoolefins having 2 to 4 carbon atoms and more particularly to the stabilization of polypropylene.

It is an object of the present invention to prepare novel organotin salts.

Another object is to prepare novel stabilized compositions containing solid polymers of monoolefins having 2 to 4 carbon atoms, preferably polypropylene.

A further object is to stabilize polypropylene and other polymers of monoolefins having 2 to 4 carbon atoms with synergistic stabilizer compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detail description.

It has now been found that these objects can be attained by preparing certain organotin salts of sulfur-containing carboxylic acids and by stabilizing polymers of monoolefins, preferably polypropylene, with these and other organotin salts of sulfur-containing carboxylic acids.

The novel compounds include the compounds of the formulae (I)   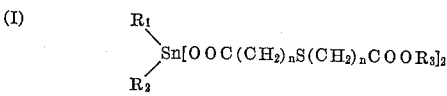

(II)   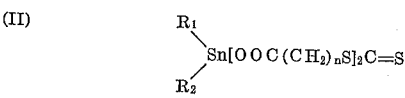

(IIa)   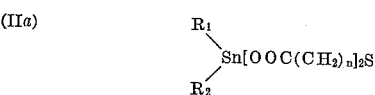

where $R_1$ and $R_2$ are hydrocarbon and haloaryl, $R_3$ is a hydrocarbon group and $n$ is a positive integer. Preferably $n$ is 1 or 2. Examples of such compounds include dibutyltin trithiocarbodiglycolate, dibutyltin thiodipropionate, dioctyltin thiodipropionate, diphenyltin thiodipropionate, dineopentyltin thiodipropionate, phenyl butyltin thiodipropionate, di-sec. butyltin thiodipropionate, dimethyltin thiodipropionate, dioctadecyltin thiodipropionate, di-p-tolyltin thiodipropionate, di-o-chlorophenyltin thiodipropionate, dicyclohexyltin thiodipropionate, didodecyltin thiodipropionate, dibenzyltin thiodipropionate, dibutyltin thiodiacetate, dioctyltin thiodiacetate, dibutyltin thiodibutyrate, dioctyltin thiodibutyrate, dibutyltin bis(monobutyl thiodipropionate), dioctyltin bis(monomethyl thiodipropionate), dibutyltin bis(monophenyl thiodipropionate), dibutyltin bis(monooctadecyl thiodipropionate), diphenyltin bis(monobutyl thiodipropionate), dibutyltin bis(monooctadecyl thiodipropionate), diphenyltin bis(monobutyl thiodipropionate), dibutyltin bis(monobutyl thiodiacetate), dibutyltin bis(monobutyl thiodibutyrate), dibutyltin bis(monocyclohexyl thiodipropionate), dicyclohexyltin bis(monobutylthiodipropionate), and dibutyltin bis(monolauryl thiodipropionate).

In addition to the novel compounds set forth supra there can also be used as stabilizers for the monoolefin polymers thioacetals and thioketals belonging to one of the following groups (III)   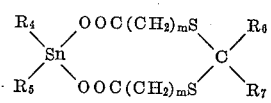

or (IIIa)   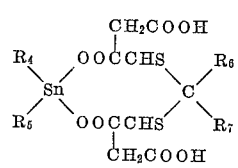

where $m$ is an integer from 1 to 8, $R_4$ and $R_5$ are hydrocarbon, e.g. alkyl, aralkyl or aryl and $R_6$ and $R_7$ are hydrogen, hydrocarbon, e.g. alkyl, alkenyl, aralkyl and aryl, hydroxyaryl, alkoxyaryl or taken together complete a cyclohexane ring, i.e. the pentamethylene radical.

(IV)   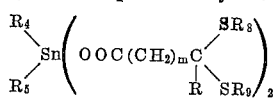

where $m$, $R_4$ and $R_5$ are defined above, $R_8$ and $R_9$ are hydrocarbon (e.g. alkyl, aralkyl and aryl, mercaptocarboxylic acid or mercaptocarboxylic acid ester and $R_{10}$ is hydrogen or hydrocarbon (e.g. alkyl, aralkyl or aryl).

(V)   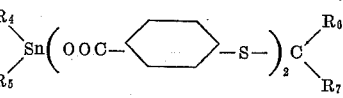

where $R_4$, $R_5$, $R_6$ and $R_7$ are as defined above.

(VI)   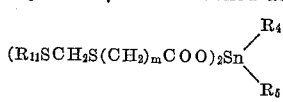

where $m$, $R_4$ and $R_5$ are defined as above and $R_{11}$ is hydrocarbon, e.g. alkyl, aralkyl or aryl.

(VII)   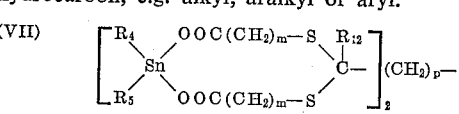

where $R_4$, $R_5$ and $m$ are defined as above, $R_{12}$ is hydrocarbon, e.g. alkyl, aralkyl or aryl and $p$ is an integer from 0 to 8.

Typical examples of compounds in Groups III and IIIa are dibutyltin propane-2,2-bis(mercaptopropionate), dibutyltin benzaldi(mercaptopropionate), dibutyltin 2-hydroxybenzaldi(mercaptopropionate), dioctyltin 2-hydroxybenzaldi(mercaptopropionate), dibutyltin 4 - hydroxybenzaldi(mercaptopropionate), dibutyltin 3 - hydroxybenzaldi(mercaptopropionate), dibutyltin 2-hydroxybenzaldi(mercaptoacetate), dibutyltin 2-hydroxybenzaldi(mercaptobutyrate), dineopentyltin propane-2,2-bis(mercaptopropionate), dibutyltin isodecane 1,1-bis(mercaptopropionate), dioctyltin propane - 2,2 - bis(mercaptopropionate), dibutyltin cyclohexyl-1,1-bis(mercaptopropionate), dimethyltin propane-2,2-bis(omega mercaptooctanoate), dioctadecyltin methane bis(mercaptoacetate), dibutyltin benzaldi(mercaptoacetate), diphenyltin propane - 2,2 - bis(mercaptopropionate), dibutyltin propane-3,3-bis(mercaptopropionate), butyl lauryl tin phenylacetaldi(mercaptoacetate), dihexyltin 2 - butene-1,1-bis-(mercaptopropionate), dibutyltin diphenylmethane bis-(mercaptopropionate), dibenzyltin propane-2-mercaptoacetate - 2 - mercaptopropionate, dibutyltin 2-hydroxy-4- methoxybenzaldi(mercaptobutyrate) and dibutyltin propane-2,2-bis(mercaptosuccinate).

Typical examples of compounds in Group IV are dibutyltin di[4,4-bis(dodecylthio)valerate], dibutyltin di[4,4-bis(phenylthio)valerate], dioctadecyltin di[4,4-bis(phenylthio)valerate], dioctyltin di[4,4-bis(carboxyethylthio)valerate], butyl octyl tin di[4,4-bis(carbobutoxyethylthio)valerate], dimethyltin di[4,4-bis(dodecylthio)valerate], dioctyltin di[ethyl-3,3-bis(carboxyethylthio)butyrate], diphenyltin di[3,3-bis(benzylthio)-3-phenyl propionate].

Typical examples of compounds in Group V are dibutyltin 2-hydroxylbenzaldi(2'-mercaptobenzoate), dibutyltin propane-2,2-bis(2'-mercaptobenzoate), diphenyltin methane-bis(4-mercaptobenzoate), dilauryltin diphenylmethane bis(3-mercaptobenzoate), dimethyltin ethane-1,1-bis(2'-mercaptobenzoate).

Typical examples of compounds in Group VI are dibutyltin di(dodecylthiomethyl thioacetate), dilauryltin di(methylthiomethyl thiopropionate), dimethyltin di(phenylthiomethyl thiooctanoate), diphenyltin di(benzylthiomethyl thioacetate).

Typical examples of compounds in Group VII are di(dibutyltin)ethane-1,1,2,2-tetrakis(mercaptopropionate), di(dioctyltin)-1-methyl ethane-1,1,2,2-tetrakis(mercaptoacetate), di(phenyltin)butane-1,1,4,4-tetrakis(mercaptopropionate), di(dilauryltin)hexane-1,1,6,6-tetrakis(mercaptooctanoate).

The preferred compounds are those in Groups I and III.

The compounds in Group I can be prepared by reacting the appropriate dihydrocarbon or dihaloaryl tin oxide in equimolecular amounts with the appropriate thiodialkanoic acid or trithiocarbodialkanoic acid. The compounds in Group II can be prepared by reacting one mole of the appropriate dihydrocarbon or dihaloaryl tin oxide with two moles of the appropriate half ester of a thiodialkanoic acid or trithiocarbodialkanoic acid.

The compounds in Groups III, IIIa, IV, V, VI and VII can be made in the manner set forth in Hechenbleikner et al. application 103,256, filed April 17, 1961, now U.S. Patent 3,078,290.

It is surprising that the above set forth tin compounds are stabilizers for monoolefin polymers since mixtures of alkyltin oxides and mercaptal acids do not stabilize such polymers, e.g. polypropylene, even though the mixtures of alkyltin oxides and mercaptal acids are effective stabilizers for vinyl chloride resins as shown more fully in the aforementioned Hechenbleikner et al. application, especially Examples 47-70 thereof.

While the stabilizers of the present invention can be used with polyethylene, polypropylene, ethylene propylene copolymers (e.g. a 50–50 copolymer), polybutylene and polyisobutylene they are preferably employed with polymers and copolymers of propylene. The problems of stabilizing polypropylene are more complex than those of stabilizing polyethylene. Polypropylene contains a tertiary carbon atom which is easily oxidized. This is missing from polyethylene.

The present invention is suitable for the stabilization of the monoolefin polymers regardless of the method employed to prepare the polymer. Thus, there can be stabilized polyethylene, polypropylene, polybutylene and copolymers of ethylene with propylene prepared with Ziegler type polymerization catalysts, e.g., trialkyl aluminum (tributyl aluminum) with titanium tetrachloride or dibutyl beryllium with titanium tetrachloride. The polymers can be prepared using any of the Ziegler type of catalysts as set forth in Salyer Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

The organotin salts can be used as stabilizers in an amount of 0.01–10% by weight of the monoolefin polymer. Preferably 0.1–5% of the stabilizer is employed. When the organotin salts are employed with other stabilizers usually 0.01–10% and preferably 0.1–5% of total stabilizer based on the weight of the polymer is employed.

As previously set forth the organotin compounds can be employed alone. However, synergistic action has been observed when the organotin salts are employed together with certain other stabilizers. Particularly good results are obtained when there is employed in addition to the organotin salt a neutral sulfur compound having a thio linkage beta to a carbon atom having both a hydrogen atom and a carboxyl group attached thereto. Such compounds are used in an amount of 0.01–10% by weight, preferably 0.1–5%. The preferred thio compound is dilauryl thiodipropionate. Other thio compounds include distearyl-3,3'-thiodipropionate (dioctadecylthiodipropionate), dicyclohexyl-3,3'-thiodipropionate, dicetyl-3,3'-thiodipropionate, dihexyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiopropionate, diethyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-heydroxymethylmercapto propionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiasebacate, dilauryl-4,7,8,11-tetrathiatetradecandioate, dimyristyl-4,11-dithiatetradecandioate, lauryl-3-benzothiazylmercaptopropionate, as well as other alkyl, cycloalkyl and aryl esters of the beta thiocarboxylic acids set forth in Gribbins Patent 2,519,755. Preferably, the esterifying alcohol has 10 to 18 carbon atoms.

Other beta thiocarboxylic acids include stearyl (1,2-dicarboethoxyethylthio) acetate, stearyl (1,2-dicarbolauryloxyethylthio) acetate, lauryl (1,2-dicarboethoxyethylthio) acetate or the like. Compounds of this type can be made in known fashion by addition of an alkyl ester of mercaptoacetic acid to a dialkyl ester of maleic acid. Similar beta thiocarboxyl compounds can by used which are made by addition of an RSH compound across the maleic ester double bond and where R is alkyl, aryl, alkylcarboxyalkyl, arylcarboxyalkyl or aralkyl. Examples of such compounds are decylthiodilaurylmaleate, phenylthiodioctyl maleate, cetyl (1,2-dicarboethoxyethylthio) propionate and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The thermal stability of polypropylene and other polymers of a monoolefin is adversely affected by impurities including residual catalysts. When thermal stability is important in addition to oxidative stability it has been found valuable to include alkaline earth metal salts of fatty acids in an amount of 0.01–10% by weight, preferably 0.1–5%, in the organotin salt formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate and magnesium stearate. Other fatty acid salts such as cadmium 2-ethylhexoate, cadmium stearate and zinc stearate can also be employed.

Particularly effective synergistic stabilizing compositions have been obtained by utilizing a mixture of (1) the organotin salt (2) the thio compound, particularly dilauryl thiodipropionate, and (3) the alkaline earth metal salt of a fatty acid.

The addition of phenolic antioxidants in an amount of 0.01–10% by weight, preferably 0.1–5%, also has proven effective. In fact the very best synergistic results have been obtained when a phenol is present in the organotin salt stabilizing composition. Examples of such phenols include 2,6-di-t-butyl-p-cresol, butylated hydroxyanisole, propyl gallate, 4,4'-thiobis(6-tertiary-butyl-m-cresol), 4,4'-cyclohexylidene diphenol, 2,5-di-tertiary-amyl hydroquinone, 4,4'-butylidene bis(6-tertiary-butyl-m-cresol), hydroquinone monobenzyl ether, 2,2'-methylene-bis(4-methyl-6-t-butylphenol), as well as the other phenols set forth in Salyer Patent 2,985,617. Other suitable phenols include 2-tertiary-butyl-4-decyloxyphenol, 2-tertiary-butyl - 4 - dodecyloxyphenol, 2 - tertiary-butyl-4-octadecyloxyphenol, 4,4'-methylene-bis-(2,6-di tertiary butyl phenol), p-aminophenol, N-lauryl-p-amino-phenol, 4,4' - thiobis(3 - methyl - 6 - t - butylphenol), bis(o-(1,1,3,3 - tetramethylbutyl)phenol) sulfide, 4 - acetyl-β-resorcylic acid, A-stage p-tertiary butyl-phenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenylcarbonyl) phenoxyacetic acid and t-butylphenol.

The use of epoxy compounds in an amount of 0.01–10% by weight, preferably 0.1–5%, in the organotin salt formulations has also been found valuable. Examples of such epoxy compounds include epoxidized soya oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins, phenoxypropylene oxide, butoxy-propylene oxide, epoxidized neopentylene oleate, glycidyl epoxystearate, epoxidized α-olefins, epoxidized glycidyl soyate, di-cyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, butyl glycidyl ether, cyclohexane oxide, 4-(2,3-epoxypropoxy) acetyl phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis(9,10-epoxystearate).

Likewise it has been found desirable to include neutral esters of citric acid, particularly acetyl tributyl citrate and tributyl citrate in an amount of 0.01–10% by weight, preferably 0.1–5%, in the organotin salt formulations. Examples of such citrates include neutral citrates having the formula

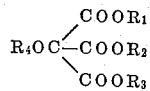

where $R_1$, $R_2$ and $R_3$ are selected from the group consisting of hydrocarbon, e.g., alkyl, aryl and cycloalkyl, and haloaryl and $R_4$ is selected from the group consisting of hydrogen, hydrocarbon, e.g., alkyl, aryl and cycloalkyl, or acyl groups. Preferably, the acyl group has 2 to 4 carbon atoms. Typical examples of such citrates are triethyl citrate, trimethyl citrate, tripropyl citrate, triisopropyl citrate, tributyl citrate, propyldibutyl citrate, tritertiary butyl citrate, triamyl citrate, trihexyl citrate, trioctyl citrate, tridecyl citrate, trioctadecyl citrate, tricyclohexyl citrate, triphenyl citrate, tribenzyl citrate, tri-p-tolyl citrate, tri-p-chlorophenyl citrate, acetyl trimethyl citrate, acetyl triethyl citrate, acetyl tripropyl citrate, acetyl tributyl citrate, acetyl propyldibutyl citrate, acetyl triamyl citrate, acetyl trioctyl citrate, acetyl trioctadecyl citrate, propionyl tributyl citrate, butyryl tributyl citrate, butyl tributyl citrate, phenyl tributyl citrate, chlorophenyl tributyl citrate, and acetyl triphenyl citrate.

The use of the citrates as stabilizers for polymers of monoolefins, particularly polypropylene, is claimed in copending application Serial No. 135,804, filed September 5, 1961.

Likewise there can be used hydrocarbon and haloaryl silicon esters of a thiodialkane carboxylic acid or half ester of such acid, or the hydrocarbon or haloaryl silicon ester of a mercaptoalkonic acid or ester thereof. Examples of such compounds include dibutylsilicon thiodipropionate, dioctylsilicon thiodipropionate, diphenylsilicon thiodipropionate, bis(tributylsilicon) thiodipropionate, dibutylsilicon di(monolauryl thiodipropionate), dibutylsilicon mercaptopropionate, and dibutylsilicon mercapytoacetate. The use of the organosilicon esters as stabilizers for monoolefin polymers, preferably polypropylene, is claimed in application Serial No. 139,877, filed September 22, 1961.

It has also been found that the use of compounds having the formula $HS(CH_2)_qCOOR_{13}$ in an amount of 0.01–10% by weight, preferably 0.1–5%, as auxiliary agents gives improved results. In the formula $q$ is an integer between 1 and 8 and $R_{13}$ is a hydrocarbon group. Examples of such compounds include steadyl mercaptoacetate, stearyl mercaptopropionate, stearyl mercaptobutyrate, butyl mercaptoacetate, butyl mercaptooctanoate, phenyl mercaptoacetate, cyclohexyl mercaptopropionate.

Additionally, there can be employed psuedothiohydantoins in an amount of 0.01–10% by weight, preferably 0.1–5%, with the organotin salts in stabilizing the monoolefin polymers, e.g. polypropylene. Examples of such pseudohyantoins include pseudothiohydantoin, 5-cetyl pseudothiohydantoin, $N^2$-nonylpseudothiohydantoin 3-$N^2$-o-phenylenepseudothiohydantoin, 3 - $N^2$ - ethylenepseudothiohydantoin, 3-$N^2$-dioctyl pseudothiohydantoin, 5,5-dimethyl pseudothiohydantoin, 5-phenyl pseudothiohydantoin, 5-p-tolyl pseudothiohydantoin, 5-p-chlorophenyl pseudothiohydantoin and, 3-$N^2$-diphenyl pseudothiohydantoin. The use of pseudothiohydantoins as stabilizers for monoolefin polymers is claimed in application Serial No. 138,002, filed September 14, 1961.

Unless otherwise indicated all parts and percentages are by weight. The parts of stabilizer in the examples are per 100 parts of polymer.

The stability tests were carried out at 133° C. The polypropylenes employed were a Hercules Profax resin having a melt index of 0.4 and Hercules Profax resin 6501 which had a melt index of 0.8. The polypropylene of melt index 0.4 took less than 24 hours to degrade under the conditions of the stability test and the polypropylene melt index 0.8 took 48 hours to degrade under these conditions.

In preparing the polypropylene samples for the tests the samples were blended in methylene chloride with the indicated stabilizing substances. The solvent was evaporated and the polymer dried in an oven at 60° C. for four hours and then pressed into a 20 mil panel. Samples of the panel measuring 3 inches by ½ inch were suspended in a forced draft oven at 133° C. and the time required to bring about degradation of the polymer noted.

Typical examples of the preparation of the novel organotin salts are set forth below.

Example 1

A suspension of 0.265 mole of trithiocarbodiglycolic acid (prepared according to Organic Synthesis, vol. 39, page 77 (1959)), and 0.26 mole of dibutyltin oxide in 250 ml. of toluene was heated under reflux until the theoretical amount of water had azeotroped off. The solution was cooled, the product collected by filtration, washed well with toluene and air dried to give a 93% yield of dibutyltin trithiocarbodiglycolate, M.P. 192–196° C., percent S 20.42 (theory 21.00); percent Sn 25.72 (theory 25.95).

*Example 2*

A mixture of 0.5 mole of dibutyltin oxide and 0.5 mole of thiodipropionic acid in 500 ml. of toluene were heated and further treated in the manner described in Example 1 to give a 98% yield of dibutyltin thiodipropionate, M.P. 84–92° C., percent S 8.03 (theory 7.85); percent Sn 28.48 (theory 29.00).

*Example 3*

The procedure of Example 1 was repeated using 0.16 mole of dioctyltin oxide and 0.16 mole of thiodipropionic acid in toluene to give an 88% yield of dioctyltin thiodipropionate, M.P. 49–56° C., percent S 6.13 (theory 6.58); percent Sn 21.3 (theory 22.8).

*Example 4*

A solution of 0.05 mole of disodium thiodipropionate in 50 ml. of water was added slowly to a solution of 0.05 mole of diphenyltin dichloride in 50 ml. of methyl ethyl ketone and the mixture was heated under reflux for 2 hours. After cooling, the resulting product was collected by filtration, washed well with water and vacuum dried to give a 91% yield of diphenyltin thiodipropionate, percent S 6.85 (theory 7.13).

*Example 5*

An etheral solution of 0.1 mole of dineopentyltin dichloride was shaken with an aqueous caustic solution to convert it to the corresponding hydroxide and then the etheral solution treated with 0.1 mole of thiodipropionic acid. After removal of the ether by evaporation, the residue was crystallized from methanol to give a 70% yield of dineopentyltin thiodipropionate, M.P. 161–6° C., percent S 27.6 (theory 27.4); percent Sn 7.00 (theory 7.39).

*Example 6*

The procedure of Example 4 was employed utilizing 0.1 mole of the sodium salt of monobutyl thiodipropionate and 0.05 mole of dibutyltin dichloride to produce dibutyltin bis(monobutylthiodipropionate).

The stabilization results at 133° C. are shown in the following examples. The polymer in Example 18 was Alathon 14, a low density, high pressure polyethylene (molecular weight about 20,000, density about 0.916). The polymer in the other examples was polypropylene having the indicated melt index.

*Example 7*

The stabilizer was 0.5% of dioctyltin thiodipropionate and the polypropylene had a melt index of 0.4. It took 48 hours for the polypropylene to degrade, an improvement of more than 24 hours over the unstabilized polypropylene.

*Example 8*

The stabilizer was 0.5% of dibutyltin benzaldi(mercaptoacetate) and the polypropylene had a melt index of 0.4. It took 24 hours for the polypropylene to degrade, a slight improvement over the unstabilized polypropylene.

*Example 9*

The stabilizer was 0.5% of dibutyltin o-hydroxybenzaldi(mercaptopropionate) and the polypropylene had a melt index of 0.8. It took 96 hours for the polypropylene to degrade, an improvement of 48 hours over the unstabilized polypropylene.

*Example 10*

The stabilizer was 0.5% of dineopentyltin thiodipropionate and the polypropylene had a melt index of 0.8. It took 96 hours for the polypropylene to degrade.

*Example 11*

The stabilizer was 0.5% of dibutyltin trithiocarbodiglycolate and the polypropylene had a melt index of 0.8. It took 96 hours for the polypropylene to degrade.

*Example 12*

The stabilizer was 0.5% of dibutyltin bis(monobutyl thiodipropionate) and the polypropylene had a melt index of 0.8. It took 72 hours for the polypropylene to degrade.

*Example 13*

The stabilizer was a mixture of 0.166% of dilauryl thiodipropionate and 0.166% calcium stearate. It took 72 hours for polypropylene of melt index 0.8 to degrade. This was a comparison example so that the effect on stability of polypropylene of the organotin compounds could be noted when employing other additives.

*Example 14*

|  | Percent |
|---|---|
| Dibutyltin bis(monobutyl thiodipropionate) | 0.166 |
| Dilauryl thiodipropionate | 0.166 |
| Calcium stearate | 0.166 |

The polypropylene of melt index 0.8 was stable for 72 hours.

*Example 15*

|  | Percent |
|---|---|
| Dibutyltin benzaldi(mercaptoacetate) | 0.166 |
| Dilauryl thiodipropionate | 0.166 |
| Calcium stearate | 0.166 |

The polypropylene of melt index 0.8 was stable for 120 hours.

*Example 16*

|  | Percent |
|---|---|
| Dibutyltin thiodipropionate | 0.166 |
| Dilauryl thiodipropionate | 0.166 |
| Calcium stearate | 0.166 |

The polypropylene of melt index 0.8 was stable for 96 hours.

*Example 17*

|  | Percent |
|---|---|
| Dibutyltin o-hydroxybenzaldi(mercaptoacetate) | 0.166 |
| Dilauryl thiodipropionate | 0.166 |
| Calcium stearate | 0.166 |

The polypropylene of melt index 0.8 was stable for 312 hours.

*Example 18*

The procedure of Example 17 was repeated but the polypropylene was replaced by polyethylene to give a stabilized polyethylene.

*Example 19*

|  | Percent |
|---|---|
| Dibutyltin isodecane-1,1-bis(mercaptopropionate) | 0.166 |
| Dilauryl thiodipropionate | 0.166 |
| Calcium stearate | 0.166 |

The polypropylene of melt index 0.8 was stable for 120 hours.

*Example 20*

|  | Percent |
|---|---|
| Dibutyltin trithiocarbodiglycolate | 0.166 |
| Dilauryl thiodipropionate | 0.166 |
| Calcium stearate | 0.166 |

The polypropylene of melt index 0.8 was stable for 144 hours.

Example 21

| | Percent |
|---|---|
| Diphenyltin thiodipropionate | 0.166 |
| Dilauryl thiodipropionate | 0.166 |
| Calcium stearate | 0.166 |

The polypropylene of melt index 0.8 was stable for 120 hours.

Example 22

| | Percent |
|---|---|
| Dineopentyltin thiodipropionate | 0.166 |
| Dilauryl thiodipropionate | 0.166 |
| Calcium stearate | 0.166 |

The polypropylene of melt index 0.8 was stable for 192 hours.

Example 23

| | Percent |
|---|---|
| Dibutyltin o - hydroxybenzaldi(mercaptopropionate) | 0.166 |
| Dilauryl thiodipropionate | 0.166 |
| Calcium stearate | 0.166 |

The polypropylene of melt index 0.8 was stable for 120 hours.

Example 24

| | Percent |
|---|---|
| Dioctyltin thiodipropionate | 0.166 |
| Dilauryl thiodipropionate | 0.166 |
| Calcium stearate | 0.166 |

The polypropylene of melt index 0.8 was stable for 120 hours.

Example 25

| | Percent |
|---|---|
| Dibutyltin o - hydroxybenzaldi(mercaptopropionate) | 0.125 |
| Dilauryl thiodipropionate | 0.125 |
| Stearyl mercaptoacetate | 0.125 |
| Calcium stearate | 0.125 |

The polypropylene of melt index 0.8 was stable for 408 hours.

Example 26

| | Percent |
|---|---|
| Dibutyltin o - hydroxybenzaldi(mercaptopropionate) | 0.125 |
| Dilauryl thiodipropionate | 0.125 |
| Propyl gallate | 0.125 |
| Calcium stearate | 0.125 |

The polypropylene of melt index 0.8 was stable for 720 hours.

Example 27

| | Percent |
|---|---|
| Dioctyltin thiodipropionate | 0.166 |
| Polymesitylenedisulfide | 0.166 |
| Calcium stearate | 0.166 |

The polypropylene of melt index 0.8 was stable for 240 hours.

Example 28

| | Percent |
|---|---|
| Dioctyltin thiodipropionate | 0.125 |
| Pseudo thiohydantoin | 0.125 |
| Dilauryl thiodipropionate | 0.125 |
| Calcium stearate | 0.125 |

The polypropylene of melt index 0.8 was stable for 240 hours.

Example 29

| | Percent |
|---|---|
| Dioctyltin mercaptopropionate | 0.125 |
| Pseudothiohydantoin | 0.125 |
| Dilauryl thiodipropionate | 0.125 |
| Calcium stearate | 0.125 |

The polypropylene of melt index 0.8 was stable for 240 hours.

Example 30

| | Percent |
|---|---|
| Dibutyltin o - hydroxybenzaldi(mercaptopropionate) | 0.25 |
| 2,6-di-t-butyl-p-cresol | 0.25 |

The polypropylene of melt index 0.8 had improved stability.

Example 31

| | Percent |
|---|---|
| Dibutyltin o - hydroxybenzaldi(mercaptopropionate) | 0.166 |
| Dilauryl thiodipropionate | 0.166 |
| Propyl gallate | 0.166 |

The polypropylene of melt index 0.8 had improved stability.

Example 32

| | Percent |
|---|---|
| Dibutyltin o - hydroxybenzaldi(mercaptopropionate) | 0.125 |
| Dilauryl thiodipropionate | 0.125 |
| Epoxidized soybean oil | 0.125 |
| Calcium stearate | 0.125 |

The polypropylene of melt index 0.8 had improved stability.

Example 33

| | Percent |
|---|---|
| Dibutyltin propane-2,2-bis(mercaptopropionate) | 0.166 |
| Dilauryl thiodipropionate | 0.166 |
| 2,6-di-t-butyl-p-cresol | 0.166 |

The polypropylene of melt index 0.8 had improved stability.

The stabilizer compositions can be packaged and sold as such and can be blended into the polymer of the monoolefin by the processer or user of the polymer. Alternatively, the polymer manufacturer can blend the stabilizer into the polymer and sell the stabilized polymer to the processer or ultimate user.

What is claimed is:
1. Dihydrocarbon tin salt of trithio-carbodiglycolic acid having the formula

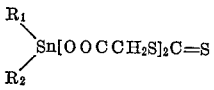

where $R_1$ and $R_2$ are hydrocarbon groups.

2. Dialkyltin salt of trithio-carbodiglycolic acid having the formula

References Cited by the Examiner

UNITED STATES PATENTS

| 2,680,107 | 6/54 | Leistner et al. | 260—45.75 |
| 2,727,917 | 12/55 | Mack et al. | 260—429.7 |
| 2,938,013 | 5/60 | Mack et al. | 260—45.75 |
| 2,981,717 | 4/61 | Boultbee | 260—45.75 |
| 2,985,617 | 5/61 | Salyer et al. | 260—45.75 X |
| 3,019,247 | 1/62 | Mack et al. | 260—429.7 |
| 3,126,400 | 3/64 | Cramer et al. | 260—429.7 |

FOREIGN PATENTS

| 21,727 | 8/61 | Germany. |
| 893,954 | 4/62 | Great Britain. |

OTHER REFERENCES

Chemical Abstracts, vol. 54, 16925 (1960).

TOBIAS E. LEVOW, *Primary Examiner.*

ALPHONSO D. SULLIVAN, LEON J. BERCOVITZ,
*Examiners.*